US009726751B2

(12) United States Patent
Hedley

(10) Patent No.: US 9,726,751 B2
(45) Date of Patent: Aug. 8, 2017

(54) MEASURING TIME OF ARRIVAL OF A SIGNAL

(71) Applicant: COMMONWEALTH SCIENTIFIC AND INDUSTRIAL RESEARCH ORGANISATION, Campbell (AU)

(72) Inventor: Mark Hedley, St. Leonards (AU)

(73) Assignee: COMMONWEALTH SCIENTIFIC AND INDUSTRIAL RESEARCH ORGANISATION, Campbell (AU)

( * ) Notice: Subject to any disclaimer, the term of this patent is extended or adjusted under 35 U.S.C. 154(b) by 246 days.

(21) Appl. No.: 14/399,506

(22) PCT Filed: May 7, 2013

(86) PCT No.: PCT/AU2013/000468
§ 371 (c)(1),
(2) Date: Nov. 6, 2014

(87) PCT Pub. No.: WO2013/166546
PCT Pub. Date: Nov. 14, 2013

(65) Prior Publication Data
US 2015/0094086 A1 Apr. 2, 2015

(30) Foreign Application Priority Data

May 7, 2012 (AU) ................................ 2012901862

(51) Int. Cl.
*G01S 5/06* (2006.01)
*G01S 5/02* (2010.01)
(52) U.S. Cl.
CPC .............. *G01S 5/06* (2013.01); *G01S 5/0215* (2013.01); *G01S 5/0221* (2013.01); *G01S 5/0278* (2013.01)

(58) Field of Classification Search
CPC ........ G01S 5/0215; G01S 5/0221; G01S 5/06; G01S 5/0278; G01S 1/805; G01S 1/22;
(Continued)

(56) References Cited

U.S. PATENT DOCUMENTS 5,890,068 A 3/1999 Fattouche et al.
6,556,943 B2 4/2003 Kuwahara et al.
(Continued)

FOREIGN PATENT DOCUMENTS

GB 2 458 446 A * 9/2009 ............. G01S 11/00
WO 2009/143559 A1 12/2009
WO 2011/002372 A1 1/2011

OTHER PUBLICATIONS

International Search Report dated Jul. 17, 2013 for International Patent Application No. PCT/AU2013/000468, 5 pages.
(Continued)

*Primary Examiner* — Meless Zewdu
(74) *Attorney, Agent, or Firm* — Kilpatrick Townsend & Stockton LLP

(57) ABSTRACT

This disclosure concerns estimating the location of a transmitter using multiple pairs of locator nodes with known locations and measuring time of arrival of a signal received from a transmitter. A processor of a location estimation node first determines time difference of arrival values from time of arrival values measured by each pair of locator nodes. The processor then determines likelihood information for multiple candidate locations of the transmitter and estimates the location of the transmitter from the likelihood information. A processor further determines an initial time of arrival value for the received signal and channel impulse response for a radio channel between the transmitter and receiver. The processor then determines a time correction from the channel impulse response based on a first peak of the channel impulse response and a leading edge of the first value. The processor finally determines an improved time of arrival value of the received signal.

10 Claims, 11 Drawing Sheets

(58) Field of Classification Search
CPC ... G01S 1/26; G01S 1/21; G01S 19/40; G01S 7/4865; H04W 56/004; H04W 56/0045; H04W 56/005; H04W 56/0055; H04W 56/006; H04W 56/0065; H04W 56/0075; H04W 56/008; H04W 56/0085; H04W 64/00; H04W 64/003; H04W 56/00; H04W 56/0035; H04L 25/0202; H04L 25/0204
See application file for complete search history.

(56) References Cited

U.S. PATENT DOCUMENTS

| | | |
|---|---|---|
| 6,795,019 B2 | 9/2004 | Holt |
| 8,098,200 B1 | 1/2012 | Gines |
| 2004/0141570 A1* | 7/2004 | Yamazaki ........... H04L 25/0204 375/340 |
| 2007/0135054 A1* | 6/2007 | Belcea ................. G01S 5/0221 455/67.11 |
| 2009/0146881 A1 | 6/2009 | Mesecher |
| 2009/0149132 A1* | 6/2009 | LeFever ............... H04B 1/7075 455/67.11 |
| 2011/0205108 A1 | 8/2011 | Boyer et al. |
| 2011/0286505 A1* | 11/2011 | Hedley ................. G01S 5/0205 375/224 |

OTHER PUBLICATIONS

Shen et al., "Performance Comparison of TOA and TDOA Based Location Estimation Algorithms in LOS Environment", Proc. IEEE 5$^{th}$ Workshop on Positioning, Navigation and Communication 2008 (WPNC '08), Hannover, Mar. 27, 2008.

Extended European Search Report for corresponding European Patent Application No. 13788246.0 dated Jul. 20, 2016, 13 pages.

* cited by examiner (a)

(b)

MEASURING TIME OF ARRIVAL OF A SIGNAL

TECHNICAL FIELD

This disclosure generally concerns wireless positioning, and in particular, a method, system and computer program for estimating the location of a transmitter using multiple pairs of locator nodes. This disclosure also provides a method, system and computer program for measuring time of arrival of a signal received from a transmitter.

BACKGROUND

Wireless positioning systems generally refer to systems that track or locate a transmitter using wireless technologies, including the transmission and measurement of electromagnetic signals. Tracking is beneficial for many applications, such as to enhance safety, security or productivity. Knowing the location of people and mobile equipment may be used to enhance the safety of people on a work site. Knowing the location of patients may enable assistance to rapidly reach them if they fall or press a panic button. Tracking the location of people in a building may allow security staff to be alerted if a person enters an area to which they are not authorised. Determining the location of access points in a building allows a rogue access point to be rapidly found and dealt with. Tracking the movement of staff and materials at a work site allows the operational efficiency to be analysed and possibly improved.

Mobile networks track mobile handsets so that their location for an emergency call can be estimated (e.g. E911 in the USA). This technique has low accuracy, with a typical accuracy many tens to hundreds of meters. The location of handsets with WiFi (e.g. Apple iPhone) can be determined in some areas using the signal strength of multiple access points. However, this only works in areas where there is a sufficient density of access points and a database of their signal strength as a function of location is available.

SUMMARY

According to a first aspect, there is provided a method for estimating the location of a transmitter using multiple pairs of locator nodes with known locations, the method being implemented by a processor of a location estimation node and comprising:
(a) determining time difference of arrival values from time of arrival values measured by each pair of locator nodes based on one or more signals received from the transmitter;
(b) based on the time difference of arrival values and an error distribution of the time difference of arrival values, determining likelihood information for multiple candidate locations of the transmitter; and
(c) estimating the location of the transmitter from the likelihood information.

According to the method of the first aspect, the likelihood information represents a "likelihood, map" of the location of the transmitter. The method is Bayesian in nature and considers the error distribution of the time difference of arrival values, rather than restricting the transmitter to lie on a particular hyperbola defined by absolute time difference of arrival values. Advantageously, the location estimation according to the method is more robust to outlier measurements. Further, using the error distribution of the time difference of arrival values results in better location accuracy, compared with just assuming a general distribution.

Determining the likelihood information may further comprise:
determining, for each pair of locator nodes, individual likelihood information based on (i) time difference of arrival values determined from time of arrival values measured by the pair of locator nodes, and (ii) an error distribution of (i); and
combining the individual likelihood information of all pairs of locator nodes to determine the likelihood information in (c).

The estimated location may be a candidate location associated with a maximum value derived from the likelihood information. Alternatively, the estimated location may be a candidate location associated with a mean value derived from the likelihood information.

The error distribution may follow a predetermined model of error distribution and is a function of difference between the time difference of arrival values, and expected time difference of arrival values calculated based on known locations of a pair of locator nodes when time of arrival values are measured.

One or more locator nodes may be mobile locator node devices having a means to determine their location when the time of arrival values are measured. In this example, mobile locator nodes facilitate rapid deployment and tracking of the transmitter. This is especially useful in applications where fixed infrastructure is not available, including devices at fixed and known location and connected to a cable to a location processor.

Mobile locator nodes also facilitate more accurate location of the transmitter, particularly when there are a limited number of locator nodes.

The time of arrival values may be synchronised among the locator nodes using one of the following:
global positioning system (GPS) timing receiver of one or more locator nodes;
non-GPS synchronisation signal received by the one or more locator nodes; and
high accuracy atomic clock of one or more locator nodes.

The location estimation node may be one of the locator nodes, a central processing node in wireless communication with the locator nodes, or a node associated with the transmitter.

According to a second aspect, there is provided computer program comprising executable instructions which, when executed by a processor of a location estimation node device, cause the processor to perform the method according to the first aspect.

According to a third aspect, there is provided a location estimation node device for estimating the location of a transmitter using multiple pairs of locator nodes with known locations, the device comprises:
a processor to:
(a) determine time difference of arrival values from time of arrival values measured by each pair of locator nodes based on one or more signals received from the transmitter;
(b) based on the time difference of arrival values and an error distribution of the time difference of arrival values, determine likelihood information for multiple candidate locations of the transmitter; and
(c) estimate the location of the transmitter from the likelihood information.

According to a fourth aspect, there is provided a method for measuring time of arrival of a signal received by a locator node from a transmitter, the method being performed by a processor of a locator node and comprising:

(a) determining an initial time of arrival value for the received signal and channel impulse response for a radio channel between the transmitter and receiver;

(b) determining a time correction from the channel impulse response, wherein the determination is based on (i) a first value associated with a first peak of the channel impulse response, and (i) a second value associated with a leading edge of the first value; and (c) from the initial time of arrival value and the time correction, determining an improved time of arrival value of the received signal.

The method according to the fourth aspect takes into account multipath propagation environment in which radio signals travel from the transmitter to the locator node. By determining the time correction from the first and second values of the channel impulse response, a more accurate time of arrival value is obtained. Improving the time of arrival estimation not only allows more accurate localisation and tracking of the transmitter, but also facilitates a more accurate time synchronisation among locator nodes in the system.

The time correction may be a time delay from the second value, and determining the time correction comprises:
determining a ratio of the second value to the first value;
determining a location, which corresponds to the ratio, on a leading edge of a largest peak of an ideal channel impulse response with no multipath present; and
determining the time correction as a time delay from the location to the largest peak of the ideal channel impulse response.

The first value may be a first peak of the channel impulse response with a magnitude that exceeds or equals a first threshold multiplied by the largest peak of the channel impulse response; and the second value may lie on the leading edge of the first value and corresponds to either a minimum or a second threshold multiplied by the first value.

The signal received from the transmitter may be a direct sequence spread spectrum (DSSS) signal, in which case the method further comprises:
performing a frequency offset correction of the received signal to obtained a frequency-corrected signal; and
determining the channel impulse response by correlating a reconstructed section of the transmitted signal against the frequency-corrected signal.

The signal received from the transmitter may be an orthogonal frequency division multiplexing (OFDM) signal, in which case the method further comprises:
determining a channel frequency response of the received signal using, and averaged over, one or more symbols of the received signal; and
determining the channel impulse response from the channel frequency response.

The method may further comprise performing time synchronisation on the improved time of arrival value using one of the following:
global positioning system (GPS) timing receiver of the locator node;
non-GPS synchronisation signal received by the locator node; and
high accuracy atomic clock of the locator node.

The locator node may be a mobile device having a means to determine its location when the signal is received from the transmitter.

The method may further comprise sending the improved time of arrival value to a location estimation node device to estimate the location of the transmitter according to the method of the first aspect.

According to a fifth aspect, there is provided computer program comprising executable instructions which, when executed by a processor of a locator node device, cause the processor to perform the method measuring time of arrival of a signal received by the locator node from a transmitter according to the fourth aspect.

According to a sixth aspect, there is provided a locator node device for measuring time of arrival of a signal received by a locator node from a transmitter, the device comprises:

a receiver to receive, from the transmitter, the signal; and
a processor to:
(a) determine an initial time of arrival value for the received signal and a channel impulse response for a radio channel between the transmitter and receiver;
(b) determine a time correction from the channel impulse response, wherein the determination is based on (i) a first value associated with a largest peak of the channel impulse response, and (i) a second value associated with a leading edge of the first value; and
(c) from the initial time of arrival value and the time correction, determine an improved time of arrival value of the received signal.

Cooperation with the target transmitter may not be required for the system to locate the transmitter.

Each locator node may measure time of arrival of wireless signals received from the transmitter.

Each locator node may have an independent clock.

A method is provided to regularly measure the difference in local clock times between locator nodes, hence the time difference of arrival values are measured between pairs of locator nodes.

Locator nodes may be mobile, and a method is provided to determine the location of each locator node near the time that the time of arrival of a signal is received.

The method may, based on the time difference of arrival values and an error distribution of the time difference of arrival values, determine likelihood information for multiple candidate locations of the transmitter; and estimate the location of the transmitter from the likelihood information.

Reference transmissions from known locations may be received by locator nodes.

BRIEF DESCRIPTION OF DRAWINGS

Non-limiting example(s) will now be described with reference to the accompanying drawings, in which:

FIG. 6(*b*) is an example channel impulse response of the DSSS signal.

DETAILED. DESCRIPTION

Figure 1:
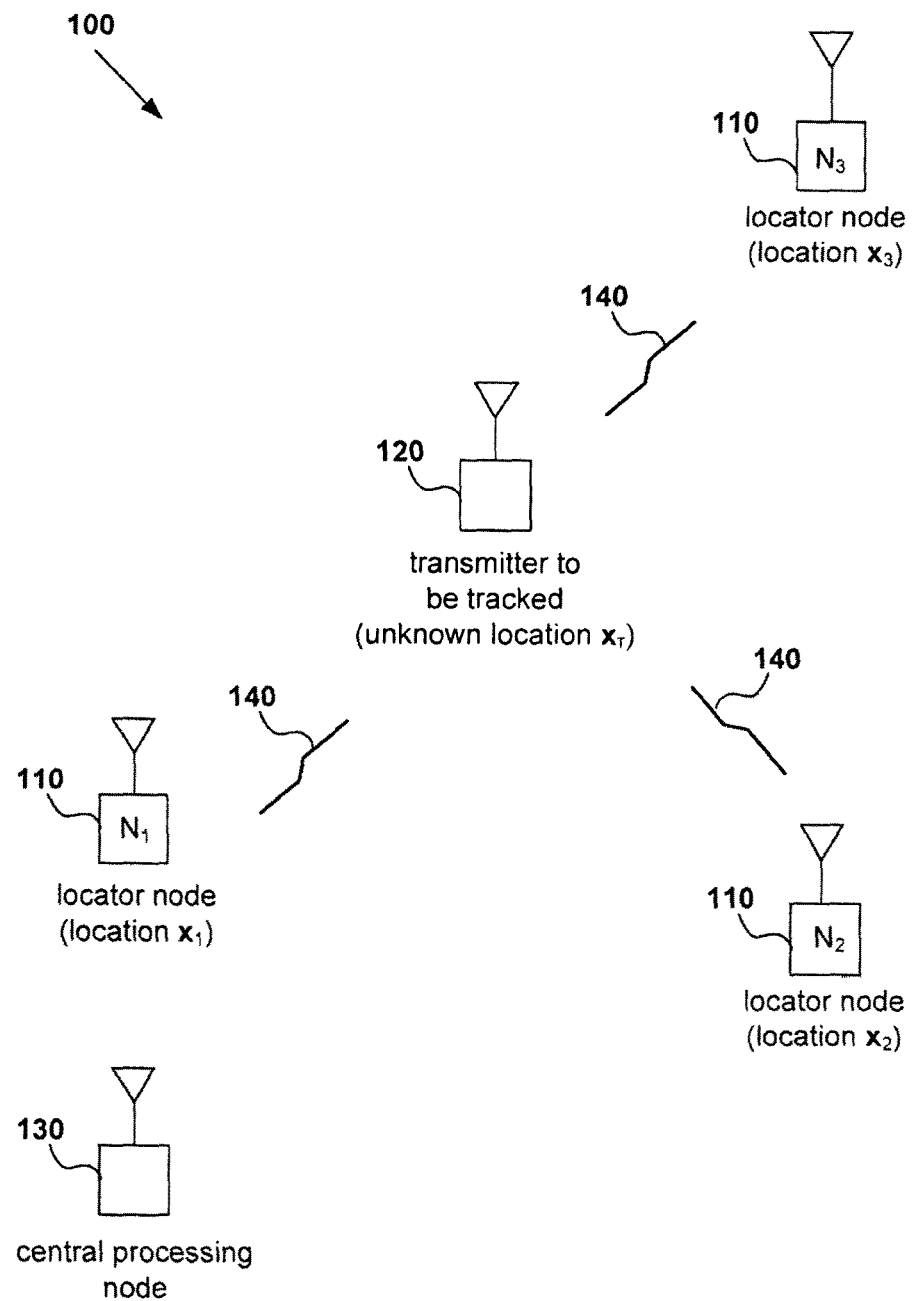
FIG. 1 is a block diagram of an example system for wireless positioning.

FIG. 1 shows an example system 100 for wireless positioning, in which multiple pairs of locator nodes 110 (e.g. $N_1$, $N_2$ and $N_3$) are deployed in the vicinity of transmitters 120 (one shown for simplicity) to be tracked, which is assumed to be at an unknown location $x_T$.

Each locator node 110 is able to receive radio signals 140 transmitted by the transmitter 120 over a radio channel between them, and the unknown location $x_T$ can be estimated using time difference of arrival (TDOA) values of the received signals. The location of the locator nodes 110 ($N_1$, $N_2$ and $N_3$) are known ($x_1$, $x_2$ and $x_3$ respectively) at the time the signals are received. Locations $x_T$, $x_1$, $x_2$ and $x_3$ may be two-dimensional (2D) in which case at least two pairs of locator nodes 110 are required; or three-dimensional (3D) which requires at least three pairs of locator nodes 110.

The transmitter 120 to be tracked may be part of a mobile node or a tag attached to an object. The transmitter 120 does not need to be cooperative with the tracking process, either because they are unwilling (e.g. wireless intruder) or unable (e.g. resource constrained or locked architecture). Any suitable wireless communication protocols may be used by the transmitter 120 to transmit the signals 140, including but not limited to IEEE 802.11 OFDM (orthogonal frequency division multiplexing) and IEEE 802.11 DSSS (direct sequence spread spectrum).

The locator nodes 110 may be any suitable device with a receiver to receive the signals 140 transmitted by the transmitter 120, and computational resources to perform necessary processing. The locator nodes 110 may be mobile devices having a means to determine their own location, fixed devices, or a combination of both. Example mobile devices include mobile phones, tablet computers and laptop computers that are connected to a cellular mobile communications network (e.g. one of the 3GPP or 4G standards) or local area network (e.g. one of the 802.11 standards), or both. The locator nodes 110 may also be access points and printers that are typically fixed, and others such as transponders and wireless modems may be attached to fixed or mobile equipment.

Figure 2:
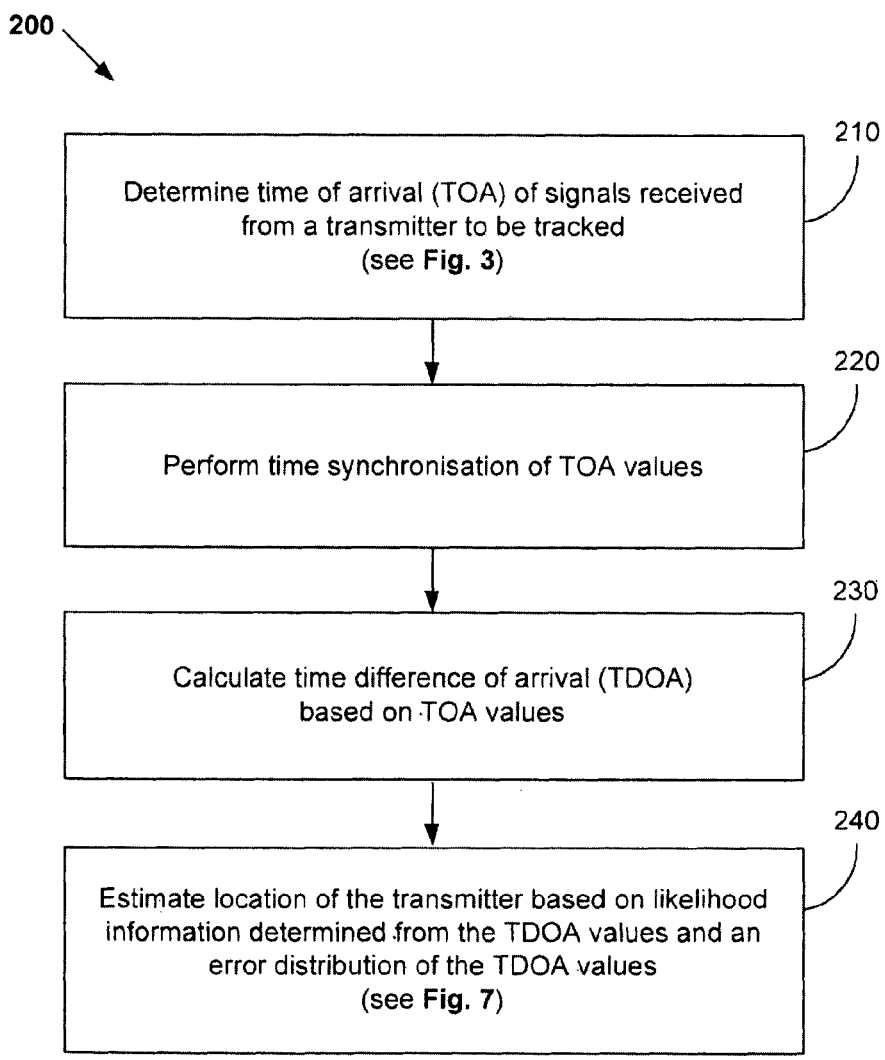
FIG. 2 is a flowchart of an example method for estimating the location of a transmitter to be tracked.

Referring also to FIG. 2, an example method for estimating the location of the transmitter 120 is shown, in which:

In step 210, locator nodes 110 each receive one or more signals 140 from the transmitter 120 to be tracked over a radio channel, and measure the time of arrival (TOA) of the received signals 140. One example method for measuring the TOA values will also be explained with reference to FIG. 3.

In step 220, time synchronisation is performed where TOA values of a locator node 110 are synchronised with a clock common to the locator nodes 110. The time synchronisation may be performed to a high resolution (typically tens of nanoseconds or better).

In step 230, time difference of arrival (TDOA) values are determined from the TOA measurements. The TDOA may be for one or more signals transmitted by the transmitter 120. Rather than using the absolute TOA values, TDOA-based location estimation examines the time difference at which a signal from the transmitter 120 arrives at a pair of locator nodes.

In step 240, the location of the transmitter 120 to be tracked is estimated based on likelihood information generated from the TDOA values and an error distribution of the TDOA values, an example of which will be explained with reference to FIG. 7.

Step 210 is performed by each locator node 110 when signals are received from the transmitter. Time synchronisation according to step 220 may be performed by each locator node 110 or by a "location estimation node". Using the synchronised TOA values, the location estimation node estimates the location of the transmitter 120 according to steps 230 and 240.

The TOA values may be sent from the locator nodes 110 to the location estimation node wirelessly, or using any suitable wired means. For example, the TOA values may be transported via a physical link between each locator node 110 and transmitter 120, such as Universal Serial Bus (USB) or Ethernet local area network (LAN).

The location estimation node may be (i) one of the locator nodes 110, (ii) the central processing node 130, or (iii) the transmitter 120. For cases (i) and (ii), the system 100 does not require cooperation of the transmitter 120, and therefore can be rapidly setup to accurately track the transmitter 120 in a wireless network. As such, the system 100 would be beneficial for security services, network security, safety (e.g. tracking workers and unauthorised personnel on work sites), tracking passengers at airports, and a range of similar applications. Furthermore, the tracking may be covert in that the transmitter 120 does not know that it is being tracked.

Although the steps in FIG. 2 are shown to be sequential, this is not necessary and some steps may also be performed concurrently. Prior to performing the steps in FIG. 2, there might be a setup stage where location devices 110 are deployed, switched on and their location information determined, for example. Although one transmitter 120 is shown in FIG. 1, it will be appreciated that the example method in FIG. 2 may be applied to determine the location of multiple transmitters 120.

The example method in FIG. 2 will now be explained in further detail below.

TOA Measurements 210

In step 210, the locator nodes 110 measure the TOA of signals received from the transmitter 120. The signals may be carrying data, and any other information such a medium access control (MAC) address to identify the transmitter 120, and packet type or sequence number to facilitate matching packets between locator nodes 110.

For each received signal, the locator nodes 110 also have the means to determine their own location relative to the other location devices or in global coordinates. Each locator node 110 (e.g. $N_1$, $N_2$ and $N_3$) may be provided with a means of determining its location (e.g. $x_1$, $x_2$ and $x_3$) when TOA measurements are taken. For example, the locator nodes 110 may include a global positioning system (GPS), or a personal dead reckoning system to determine their location, starting from a known location. The locator nodes 110 may also be static at known locations.

The locator nodes 110 are not assumed to be stationary, although it may be beneficial to move the nodes 110 about while taking measurements. This is because an increase in the diversity of baselines (i.e. locations of node pairs at which a TDOA measurement is made) increases the accuracy of the subsequent steps in FIG. 2.

Figure 3:
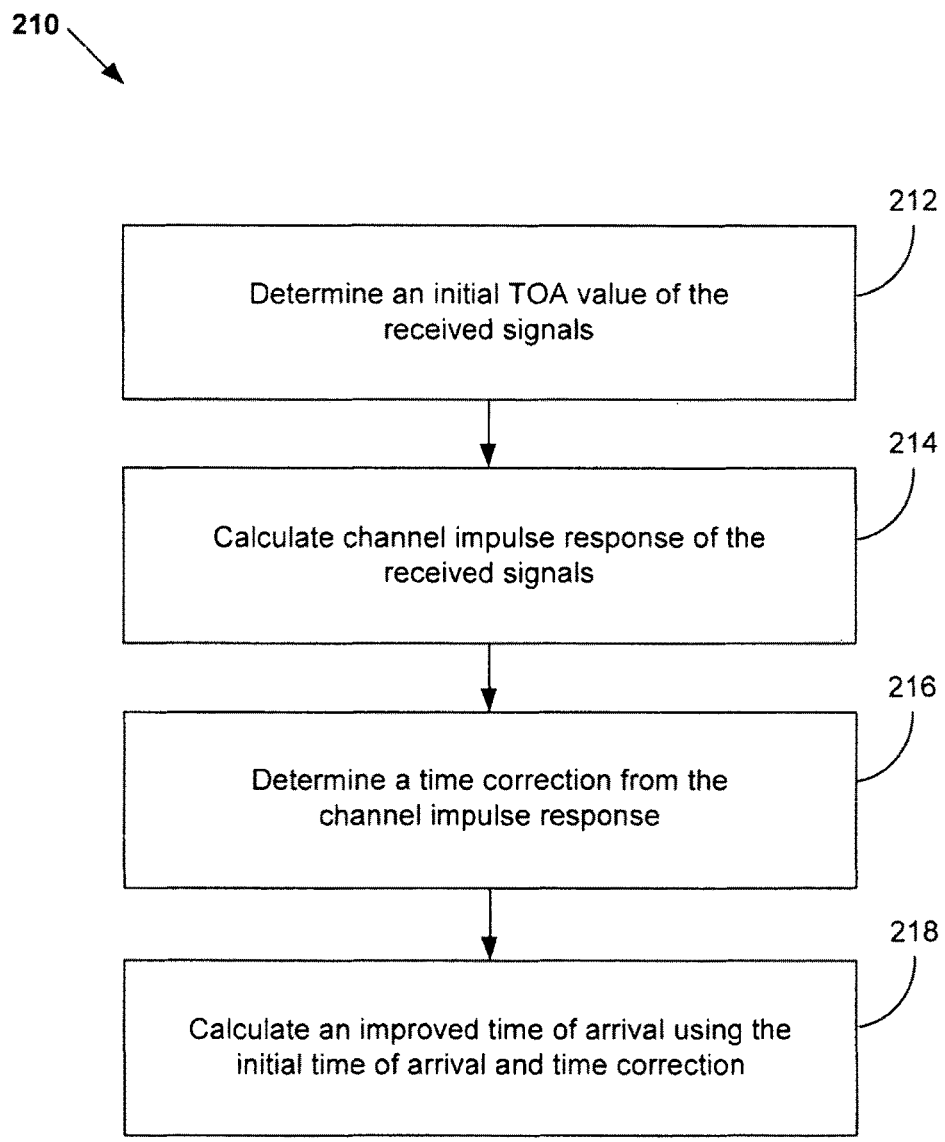
FIG. 3 is a detailed flowchart of an example of step 210 in FIG. 2.

Referring now to FIG. 3, an example method for measuring the TOA of a received signal in step 210 in FIG. 2 is shown, in which:

In step 212, an initial (coarse) TOA value of the received signal 140 is determined. Standard signal processing may be used for this purpose, such as but not limited to receiver symbol timing recovery.

In step 214, a channel impulse response for a radio channel between the transmitter 120 and the locator node 110 is determined using the received signal In step 216, the channel impulse response is used to determine a time correction of the TOA value, which takes into account the multipath propagation environment of the signal 140 received by the locator node 110.

In step 218, an improved TOA is calculated from the initial TOA and the time correction.

The output of step 210 in FIG. 2 may be a list of TOA values, $t_i$ for a particular signal transmission, where i=1, 2, 3 represents the respective locator nodes $N_1$, $N_2$ and $N_3$.

In the examples below, the transmitter 120 uses the IEEE 802.11 protocol, with transmissions using either (a) OFDM (orthogonal frequency division multiplexed) or (b) DSSS (direct sequence spread spectrum) physical layer signalling. DSSS transmissions are typically used in 802.11 beacons while OFDM transmissions are used in 802.11a/g/n packets. Note that an access point will usually transmit beacons in the 2.4 GHz band using DSSS, even when data packets are transmitted using OFDM.

(a) OFDM Transmissions

To determine an initial TOA value according to step 212 in FIG. 3, standard receiver symbol timing recovery allows coarse identification of the start of the packet as part of the process of decoding the packet. The standard cyclic prefix is of duration 800 ns thus decoding the data does not need a particularly good estimate of the start of packet.

Figure 4:
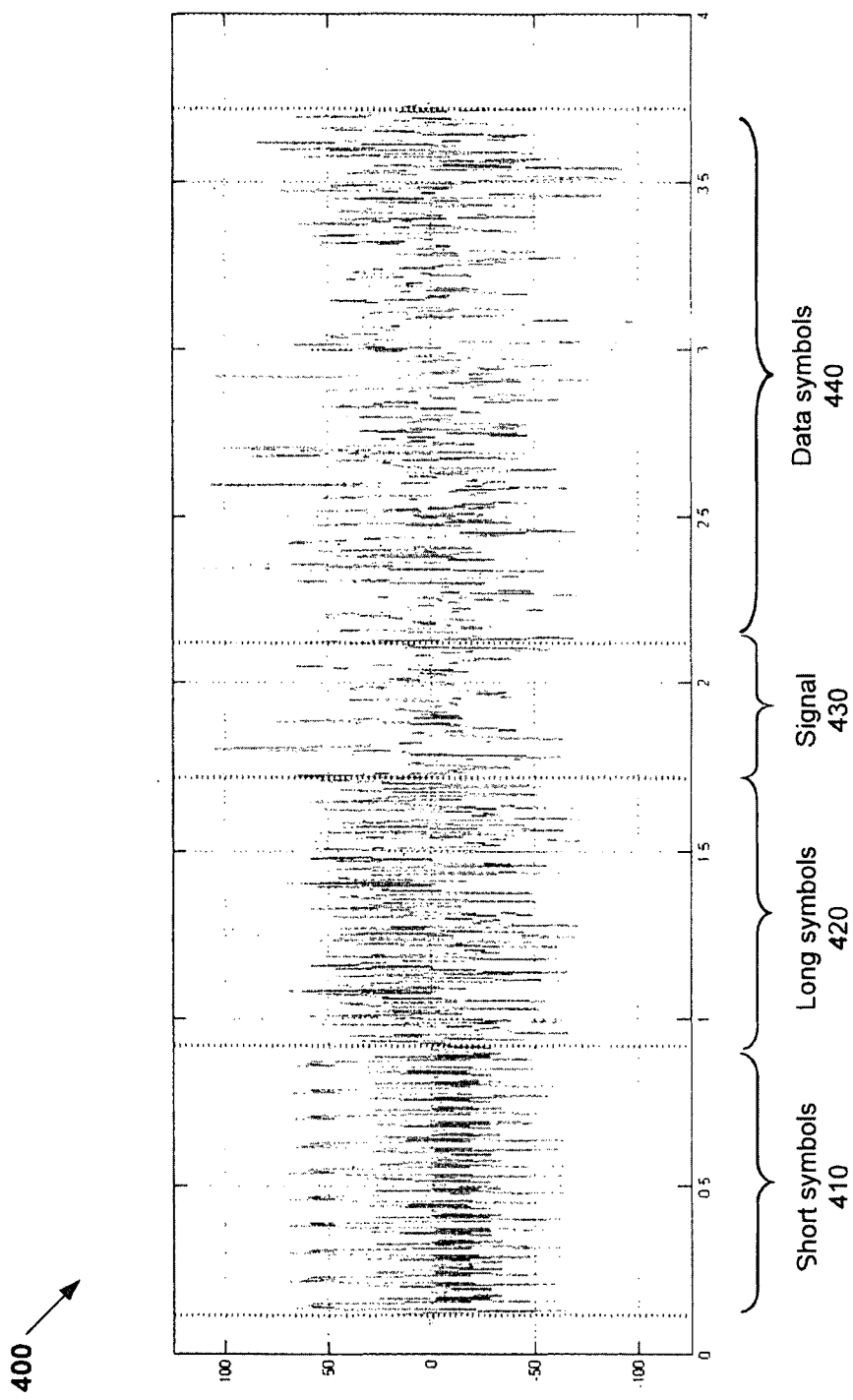
FIG. 4 is a plot of an example OFDM (orthogonal frequency-division multiplexing) signal.

An example an 802.11 OFDM transmission is shown in FIG. 4, which includes a preamble, a signal field 430 and data symbols 440. The preamble field generally includes 10 short symbols 410 and 2 long symbols 420. Each short symbol 410 represents a short training sequence of 0.8 µs long while each long symbol 420 represents a long training sequence of 3.2 µs long.

The "long training sequence" 420 provides two known symbols to estimate the frequency response of the channel. The measured complex value at each of the 52 non-zero subcarriers after frequency offset correction is divided by the known transmitted value to obtain a channel frequency response at these subcarriers. This channel frequency response is averaged over the two long training symbols and data symbols. For improved signal to noise ratio (SNR), this channel frequency response may be determined over the entire packet.

To obtain a channel impulse response for a radio channel between the transmitter 120 and locator node 110, the channel frequency response is then transformed to the time domain using an inverse Fourier transform; see step 214 in FIG. 3. Optionally, windowing may be used to suppress side lobes. In FIG. 5(a) and FIG. 5(b), examples of the channel impulse response with a Hamming window (labelled "Hamming") and without windowing (labelled "RAW") are shown. The example in FIG. 5(a) is of a transmission with no multipath interference, while the channel impulse response in FIG. 5(b) was for signals recorded in a building with substantial multipath interference.

A time correction is then calculated based on the channel impulse response; see step 216 in FIG. 3. With no multipath interference, as in FIG. 5(a), the time correction would be the location of the peak 510 (i.e. the time value on the x-axis) of the channel impulse response. With multipath interference however, as in FIG. 5(b), there are multiple reflections of the received signal, which provides multiple peaks in the channel impulse response over time.

To determine a time correction for the TOA value, the following values are considered:

(i) A first peak $v_1$ ("first value") of the channel impulse response

The largest peak of the channel impulse response is first determined, and the first peak with magnitude $v_1$ is found as the first peak in the channel impulse response with a magnitude that exceeds or equals a threshold value $T_1$ times the height of the largest peak. Threshold $T_1$ lies in the open interval (0,1), and its value is a compromise between being be sufficiently large that side lobes preceding a peak are not mistaken for a real signal peak, yet not so large that signal peaks are not normally missed. For 802.11 using OFDM with no windowing, a value of $T_1$=0.3 works well, however this might limit detection to direct path signals that are at most 10 dB below the largest received reflected signal. In FIG. 5(a), the largest peak of the channel impulse response with no windowing is generally shown at 520.

(ii) A second value $v_2$ on a leading edge of the first peak $v_1$

The second value $v_2$ lies on the leading edge of the first value $v_1$. The leading edge of the first peak $v_1$ is tracked (moving along the time axis in a negative direction) until the second value $v_2$ is found, which corresponds to either a minimum of the leading edge, or a threshold $T_2$ times the value of the first peak. The threshold value $T_2$ lies in the open interval (0,1), and its value is selected as a compromise between being low enough that the leading edge of the first peak is found, yet not so low that noise or signal processing artefacts cause the method to track past the leading edge of a real signal. For 802.11 using OFDM with no windowing, a value of $T_2$=0.1 works well.

The time correction is calculated based on the first value $v_1$ and second value $v_2$. In one example, the ratio of the second value $v_2$ to the first value $v_1$ is determined and the delay from the/second value $v_2$ to the peak value 510 or expected time of arrival value for the case with no multipath interference (see FIG. 5(a)) is then determined, such as using table lookup. In the example in FIG. 5(b), the time correction for the case with no windowing is shown as an asterisk 530.

In more detail, in the ideal case with no multipath in FIG. 5(a), the TOA is the peak (510). However, in the presence of multipath in FIG. 5(b), there may be multiple peaks, and the true TOA may precede the first true peak. For example, in FIG. 5(b) 520 is the first true peak, however 530 is the TOA. The time offset from $v_2$ to the TOA can be determined from the ideal impulse response in FIG. 5(a) (e.g. using measured data for the system or a model of the system) by calculating the ratio of $v_2$ to the peak 510 in FIG. 5(a) for points between the peak and the null of the leading edge, and for these points determining the time offset from $v_2$ to the peak 510. The relationship between $v_2/v_1$ and TOA offset may be stored in a tabular form, from which given $v_2/v_1$ the offset from $v_2$ to the TOA is read out. This relationship could also be recorded in other ways such as a mathematical model. The ratio $v_2/v_1$ lies within the range (0,1).

Figure 5:
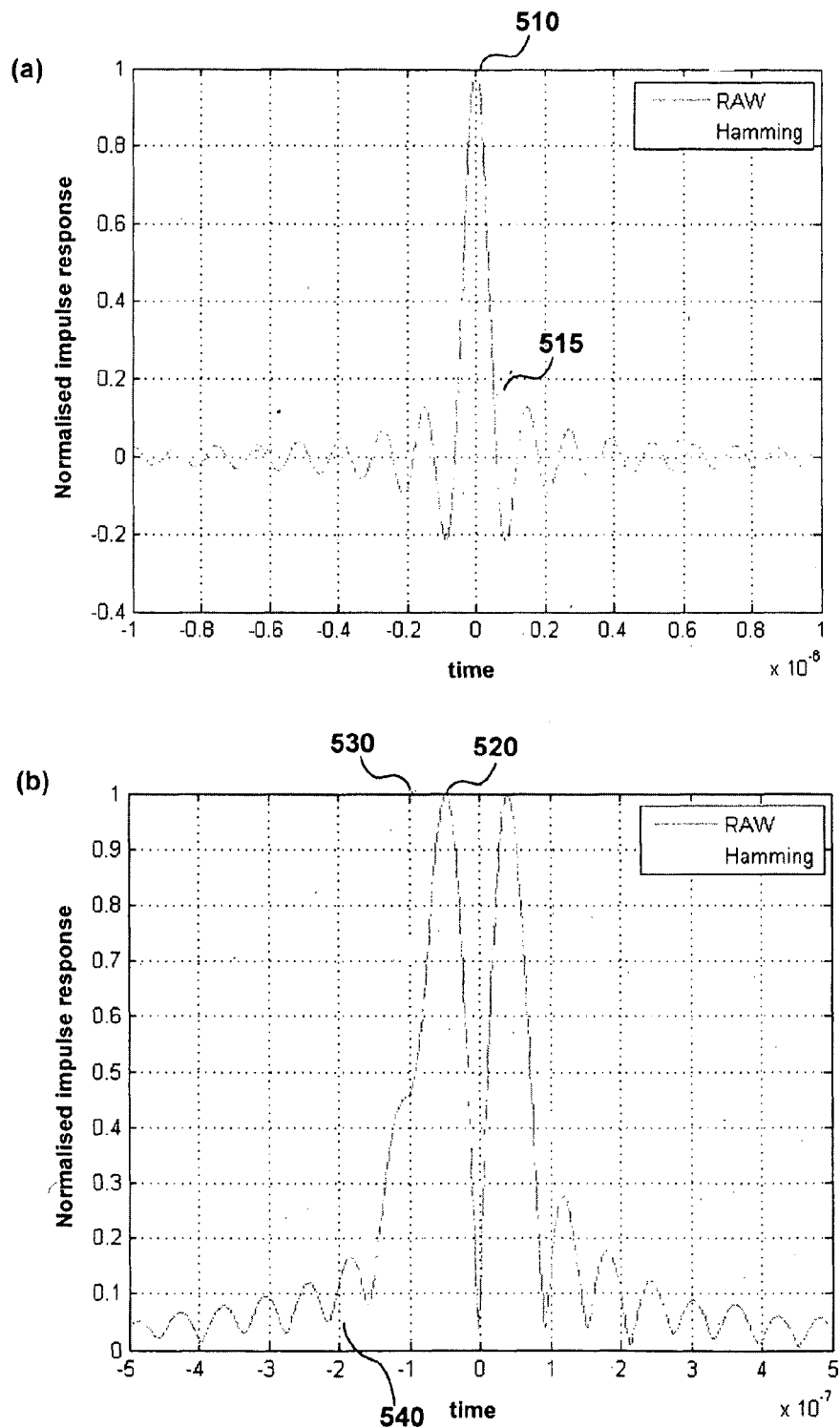
FIG. 5 is an example channel impulse response of OFDM signal (a) without multipath interference and (b) with multipath interference.

To obtain the result 530 shown in FIG. 5(*b*), timing accuracy is maximised using no window function, at the expense of not being able to find weak direct path signals relative to the largest signal. However, it will be appreciated that in different scenarios, different window functions which provide different compromises between timing accuracy and weak direct path detection may be used.

For example, windowing may be used in some scenarios to reduce the side lobes of the channel impulse response. For example, this is indicated by the channel impulse response having less wiggles for the case with Hamming windowing; see 515 in FIGS. 5(*a*) and 540 in FIG. 5(*b*). With windowing, thresholds $T_1$ and $T_2$ may have lower values than the examples above, depending upon the window function selected, as side lobes are suppressed. However, side lobe reduction is generally at the expense of broadening the peak resulting in a reduction in timing resolution.

(b) DSSS Transmissions

Similarly, symbol timing recovery of the decoding process of the DSSS packet provides a coarse TOA estimate; see also step 212 in FIG. 3. The coarse estimate may only be accurate to several hundred nanoseconds, and can be improved using the steps 214 to 218 in FIG. 3.

Standard DSSS processing does not required frequency offset correction, however for the method in FIG. 3 frequency offset correction of the received signal is first determined to obtain a frequency-corrected signal. This can be obtained by tracking the phase of the received symbols and rotating to maintain the correct constellation.

Figure 6:
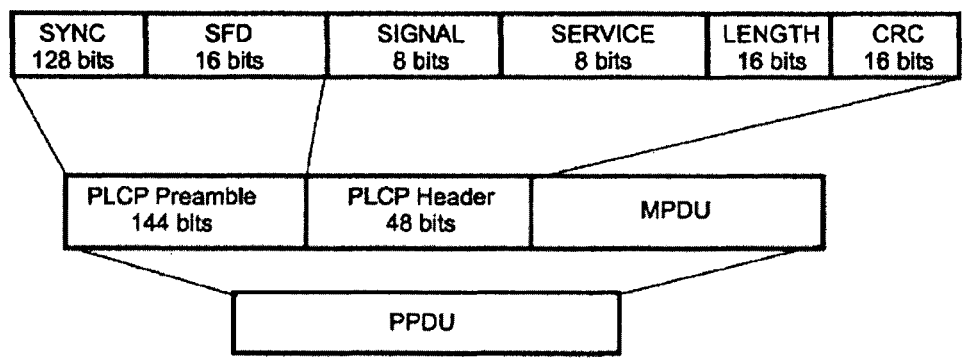
FIG. 6(*a*) is an example structure of DSSS (direct-sequence spread spectrum) signal.
Figure 6:
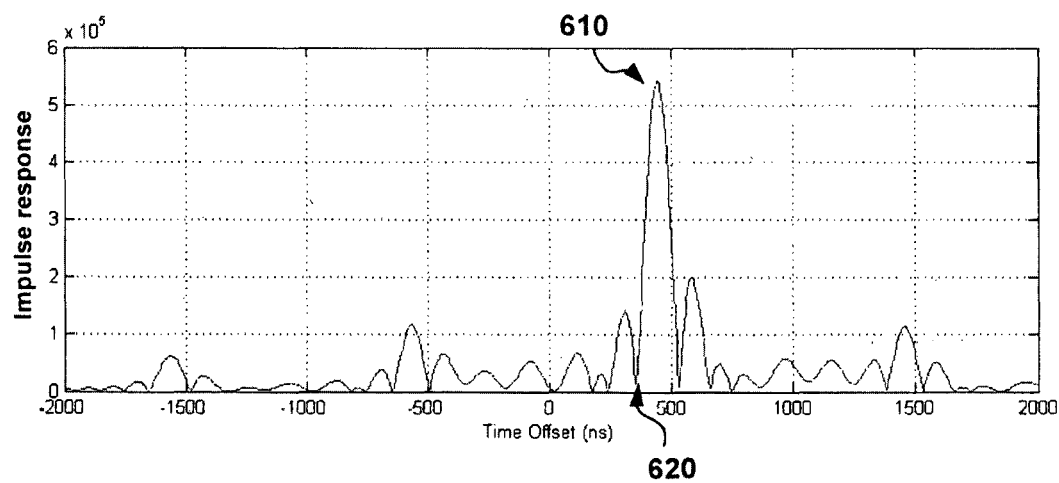

An example format of an 802.11 DSSS packet is shown in FIG. 6(*a*). The PPDU (physical layer protocol data unit) includes a PLCP (physical layer convergence procedure) preamble, PLCP header and MPDU (MAC protocol data unit). The PLCP preamble further includes a 128-bit SYNC field and a 16-bit SFD field; and the PLCP header includes SIGNAL, SERVICE, LENGTH and CRC fields.

Using the decoded data, the original DSSS transmission can be reconstructed. In one example, only the last 32 bits of the SYNC field, the 16 bits of the SFD field and the 48 bits of the PLCP header are generated (total duration 96 µs as these use the base data rate). This reconstructed section of the transmitted signal is correlated against the frequency-corrected received data to obtain a channel impulse response; see also step 214 in FIG. 3. An example channel impulse response is shown in FIG. 6(*b*).

The same process as described for OFDM transmissions is then used to calculate a time correction value which is the time offset of the DSSS signal; see also step 216 in FIG. 3. In particular, the following values are calculated:

(i) A first value $v_1$

The first value $v_1$ is the magnitude of the first peak in the channel impulse response that exceeds or equals a threshold $T_1$ times the largest peak of the channel impulse response of the received DSSS signal; see 610 in FIG. 6(*b*). For 802.11 DSSS without windowing, $T_1$=0.4 may be suitable.

(ii) A second value $v_2$

The second value $v_2$ is a minimum on a leading edge of the first value $v_1$ or threshold $T_2$ times the first value $v_1$; see 620 in FIG. 6(*b*). For 802.11 DSSS without windowing, $T_2$=0.1 may be suitable.

Similar to process used for OFDM transmissions, a ratio of the second value $v_2$ to the first value $v_1$ is first determined. Next, a location, which corresponds to the ratio, on a leading edge of a largest peak of an ideal channel impulse response with no multipath present is determined. The time correction is determined as a time delay from the location to the largest peak of the ideal channel impulse response.

The improved TOA is then estimated from the coarse TOA estimate and the time correction; see step 218 in FIG. 3. For the example in FIG. 6(*b*), the time offset is 445 nanoseconds.

Time Synchronisation 220

While the TOA may be measured using a time that is synchronised between all locator nodes 110, the measurements may also be recorded using an unsynchronised local clock in each locator node 110. In the latter case, time synchronisation is required.

At the time synchronisation step 220 in FIG. 2, a mapping from local time at each locator node 110 to a common time among all nodes 110 is determined. The mapping is then used to convert TOA values to synchronised TOA values that have a common time base across all locator nodes 110. Location nodes 110 may be time synchronised using one or more of the following techniques:

Each locator node 110 is provided with a GPS timing receiver, with the PPS (pulse per second) from the GPS timing receiver providing a reference that is typically synchronised to within 20 ns.

Time synchronisation may also use a non-GPS synchronisation signal received by the locator node 110, which could be an intentionally generated transmission or other signals such as broadcast television or mobile phone base station transmissions.

Each locator node 110 is provided with a high accuracy atomic clock, such as a chip scale caesium atomic clock with a frequency stability of one part in $10^{11}$ and available in a small and low power package. The clocks on the locator nodes 110 are compared before and after measurements to allow time and frequency offsets between the nodes to be corrected.

The locator nodes 110 may also be fixed and connected via cable to allow for distribution of a clock or data sent to a common unit for digitisation.

It will be appreciated that the above are non-limiting examples, and other suitable time synchronisation techniques may be also used, depending on the configuration of the locator nodes 110, transmitter 120 and central processing node 130. Step 220 may be performed locally by each locator node 110 or by the location estimation node.

Time Difference of Arrival (TDOA) Calculation 230

Next, the TDOA of packets at one or more pairs of locator nodes 110 is calculated based on the TOA values; see step 230 FIG. 2.

When a signal transmission from transmitter 120 is received by more than one locator node 110, the difference in the time synchronised TOA values measured by a pair of locator nodes 110 is a TDOA value. The TDOA of two TOA values can be used to determine the likelihood values for the location of the transmitter 120 in step 240 in FIG. 2.

In the example in FIG. 1, the TDOA values are determined from the TOA values $t_1$, $t_2$ and $t_3$ measured at locator nodes $N_1$, $N_2$ and $N_3$ respectively as follows:

$$\tau_{1,2}=t_1-t_2,$$

$$\tau_{1,3}=t_1-t_3,$$

$$\tau_{2,3}=t_2-t_3.$$

In the above, $\tau_{1,2}$ is the difference between the TOA values measured by locator nodes $N_1$ and $N_2$; $\tau_{1,3}$ is the difference between the TOA values measured by locator nodes $N_1$ and $N_3$; and $\tau_{2,3}$ is the difference between the TOA values measured by locator nodes $N_2$ and $N_3$.

The output of step 230 may be, for each transmitter 120, a list of TDOA values and corresponding known location of the two locator nodes 110, as follows:

$(\tau_{1,2}, x_1, x_2)$, $(\tau_{1,3}, x_1, x_3)$, and $(\tau_{2,3}, x_2, x_3)$.

The TDOA values may be generated using all pairs of locator nodes 110 receiving a particular transmission or multiple transmissions by the transmitter 120. The TDOA values and location information of the relevant locator nodes 110 are then sent to a location estimation node that performs location estimation.

Location Estimation 240

In step 240 in FIG. 2, the location of the transmitter 120 is estimated from likelihood information of multiple candidate locations of the transmitter 120. The likelihood information is determined based on the TDOA values determined in step 230 and an error distribution of the TDOA values. Throughout this disclosure, "likelihood information" includes a likelihood function or map, or likelihood values generated from the likelihood function or map.

Figure 7:
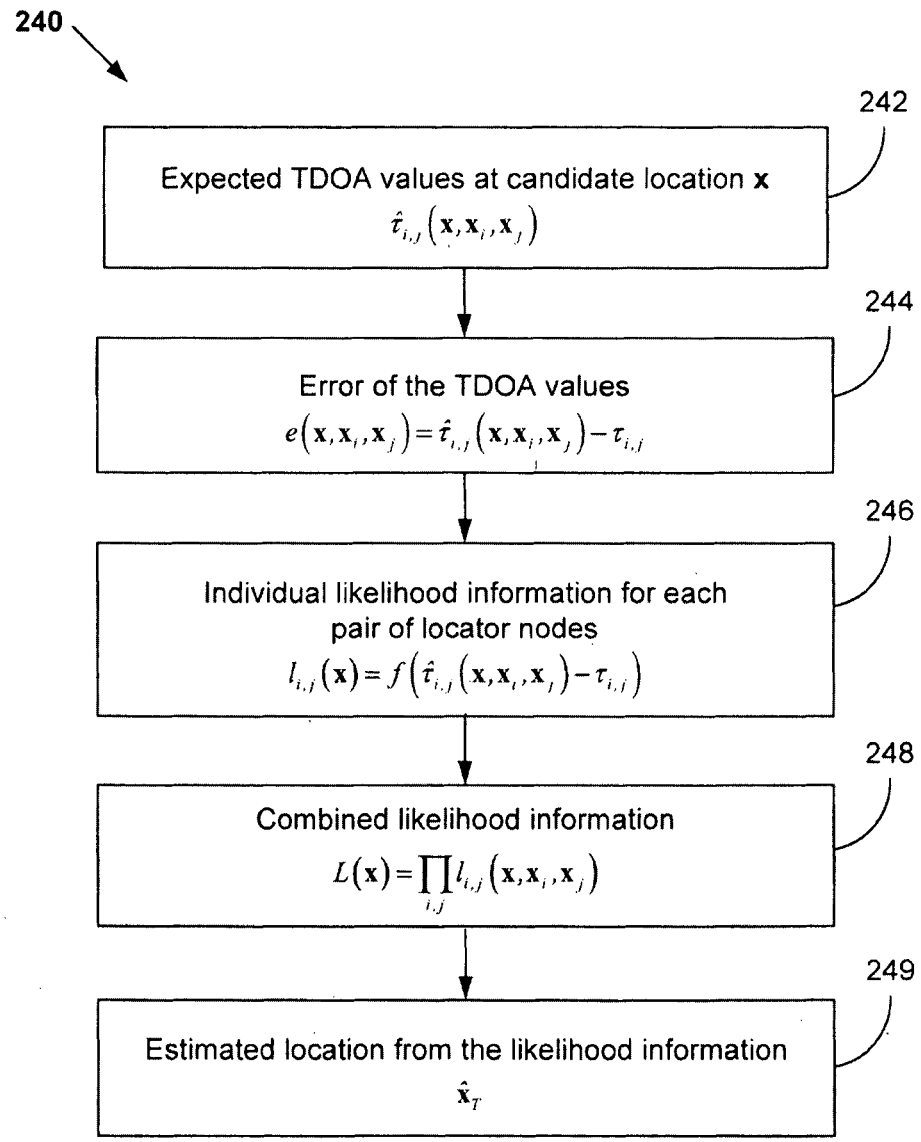
FIG. 7 is a detailed flowchart of an example of step 240 in FIG. 2.

One example implementation of step 240 is shown in FIG. 7. In step 242 in FIG. 7, the expected value of a TDOA value if the transmitter 120 is at a candidate location x is calculated as follows:

$$\hat{\tau}_{i,j}(x, x_i, x_j) = \frac{\|x - x_j\| - \|x - x_i\|}{c}.$$

In the above equation, the speed of light given by c, and the two locator nodes $N_i$ and $N_j$ are at known locations $x_i$ and $x_j$ respectively. In the example in FIG. 1, the expected TDOA values for the three pairs of nodes are as follows:

$$\hat{\tau}_{1,2}(x, x_1, x_2) = \frac{\|x - x_2\| - \|x - x_1\|}{c}$$

$$\hat{\tau}_{1,3}(x, x_1, x_3) = \frac{\|x - x_3\| - \|x - x_1\|}{c}$$

$$\hat{\tau}_{2,3}(x, x_2, x_3) = \frac{\|x - x_3\| - \|x - x_2\|}{c}$$

In step 244 in FIG. 7, the error in the TDOA values at any candidate location x of the transmitter 120 is given by the difference between the expected TDOA $\hat{\tau}_{i,j}(x)$ and the measured TDOA $\tau_{i,j}$:

$$e(x, x_i, x_j) = \hat{\tau}_{i,j}(x, x_i, x_j) - \tau_{i,j}.$$

Let the function $f(e)$ define a likelihood that the error takes particular value $e$, then the likelihood that the transmitter 120 is located at x is represented as $f(e(x))$. Function $f(e(x))$ may follow any suitable probability distribution, such as a Normal distribution $N(0, \sigma_r^2)$ with zero mean and standard deviation $\sigma_r$, and a minimum value $l_{min}$. In this case, the likelihood of a candidate location x can be modelled as:

$$f(e(x)) = \max\left(l_{min}, \exp\left(\frac{-e(x)^2}{2\sigma_\tau^2}\right)\right).$$

The function $f(e(x))$ defines a set of likelihood values for the candidate location x, rather than restricting the transmitter 120 to lie on a particular hyperbola. Advantageously, this model of distribution of errors makes the location estimation step more robust to outlier TDOA values. The likelihood function may be empirically determined in representative environments, such as multi-storey office building, warehouse, indoor sports venue, shopping centre, residential area and airport.

Using multiple TDOA values, either between the same pair of locator nodes 110 for different transmissions, or between different pairs of locator nodes 110, multiple such likelihood maps can be generated. These can be combined to refine the location of the transmitter 120 to be tracked.

In step 246 in FIG. 7, an individual likelihood map is determined each pair of locator nodes. In particular, given locations $x_i$ and $x_j$ of the locator nodes $N_i$ and $N_j$ at the time of TDOA measurement $\tau_{i,j}$, the individual likelihood map for the transmitter 120 at location x is given by:

$$l_{i,j}(x) = f(\hat{\tau}_{i,j}(x, x_i, x_j) - \tau_{i,j}).$$

Figure 8:
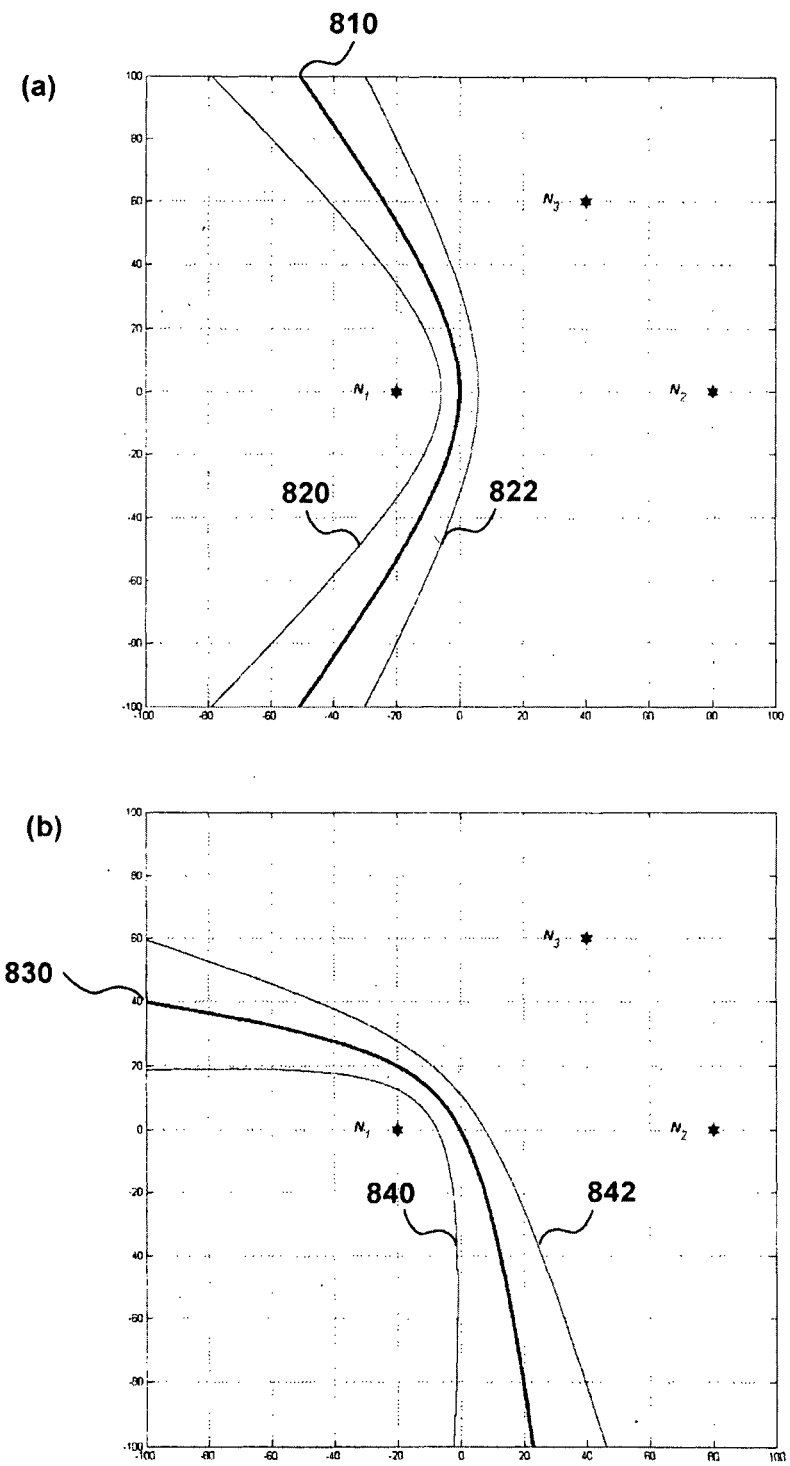
FIG. 8(a) is plot of individual likelihood information of locator nodes $N_1$ and $N_2$.
FIG. 8(b) is plot of individual likelihood information of locator nodes $N_1$ and $N_3$.

In the example in FIG. 1, (i, j) is (1, 2) for locator nodes $N_1$ and $N_2$, (1, 3) for nodes $N_1$ and $N_3$, or (2, 3) for nodes $N_2$ and $N_3$. FIG. 8(a) shows the individual likelihood map for $l_{1,2}(x)$ at levels 1.0 (see 810) and 0.5 (see 820 and 822); FIG. 8(b) shows a two level contour plot for the individual likelihood map for $l_{1,3}(x)$ at levels 1 (see 830) and 0.5 (see 840 and 842) for locator node pairs $N_1$ and $N_3$; while FIG. 9(a) shows the individual likelihood map $l_{2,3}(x)$ at levels 1 (see 910) and 0.5 (see 920 and 922).

Figure 9:
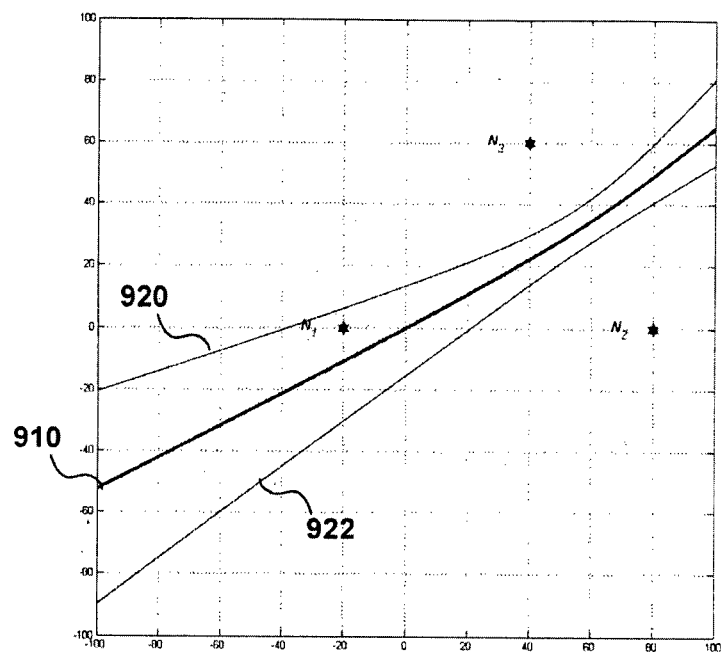
FIG. 9(a) is plot of individual likelihood information of locator nodes $N_2$ and $N_3$.
FIG. 9(b) is plot of the individual likelihood information in FIGS. 8(a), 8(b) and 9(a)
Figure 9:
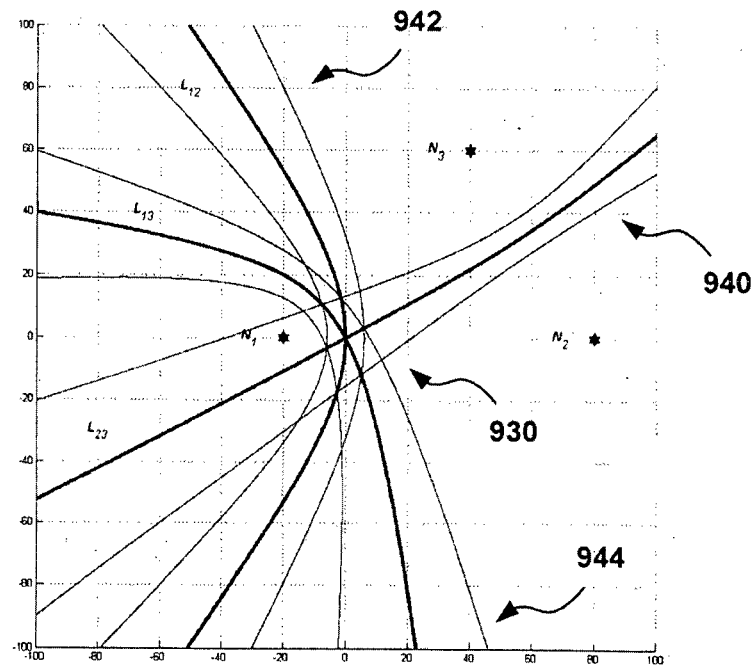

FIG. 9(b) shows a region 930 with various intersections among the individual likelihood maps in FIGS. 8(a), 8(b) and 9(a), but there are no intersections in other regions generally indicated at 940, 942 and 944. The region 930 represents a region where the individual likelihood maps intersect.

In step 248 in FIG. 7, the individual likelihood maps are combined to obtain a final likelihood map. In one implementation, under the assumption that TDOA measurements are independent, the final likelihood map L(x) is a product of the individual likelihood map of each pair of locator nodes $N_i$ and $N_j$, as follows:

$$L(x) = \prod_{i,j} l_{i,j}(x, x_i, x_j).$$

Figure 10:
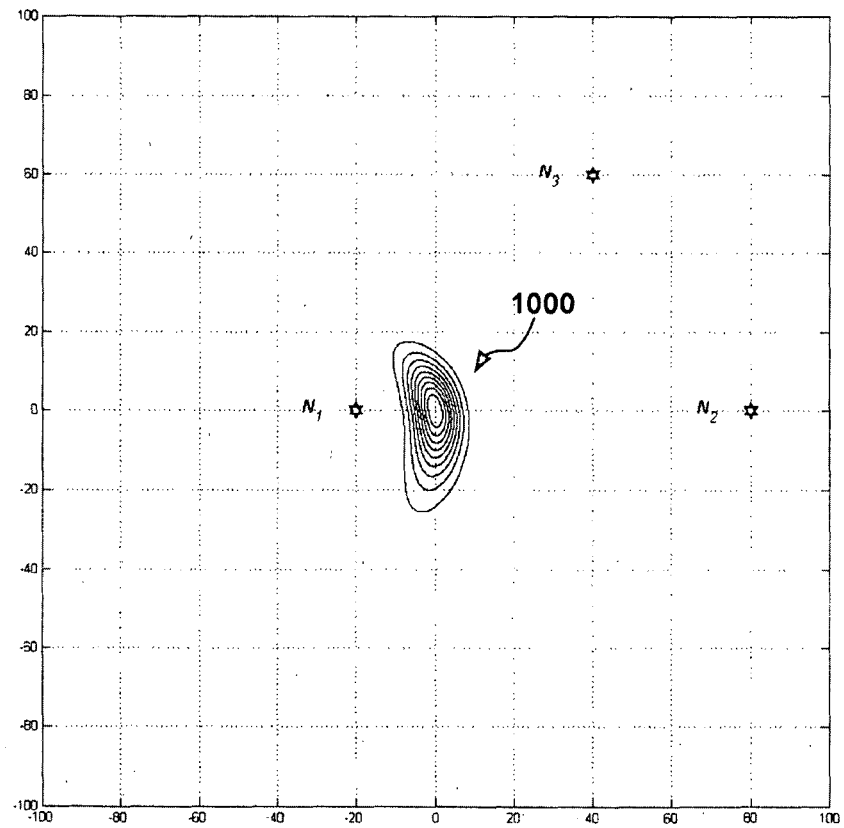
FIG. 10 is a plot of combined likelihood information generated from the individual likelihood information plots in FIGS. 8(a), 8(b) and 9(a)

An example is shown in FIG. 10, in which the contour plot of location probability density is the normalised product of $L(x) = l_{1,2}(x) \times l_{1,3}(x) \times l_{2,3}(x)$. The region generally indicated at 1000 represents the set of candidate locations or estimates $\hat{x}_T$ and corresponds to region 930 in FIG. 9(b). The region outside of 1000, however, has lower values because there are no intersections of the individual likelihood maps; see corresponding 940, 942 and 944 in FIG. 9(b) for example. The lower values represent lower likelihood that the transmitter 120 is in these regions.

In step 249 in FIG. 7, the unknown location $\hat{x}_T$ of the transmitter 120 is estimated from the final likelihood map L(x) using one of the following:

(a) Maximum Value:

$$\hat{x}_T = \underset{x}{\operatorname{argmax}} L(x)$$

(b) Mean Value:

$$\hat{x}_T = \frac{\sum xL(x)}{\sum L(x)}.$$

The above estimators are known as the maximum a posterior (MAP) and minimum mean squared error (MMSE) estimates, respectively. In cases where the distribution of $f(e(x))$ is unimodal, the MMSE estimate is preferred. An example of unimodal distribution is the Normal distribution which has a single peak.

Node Structure

Figure 11:
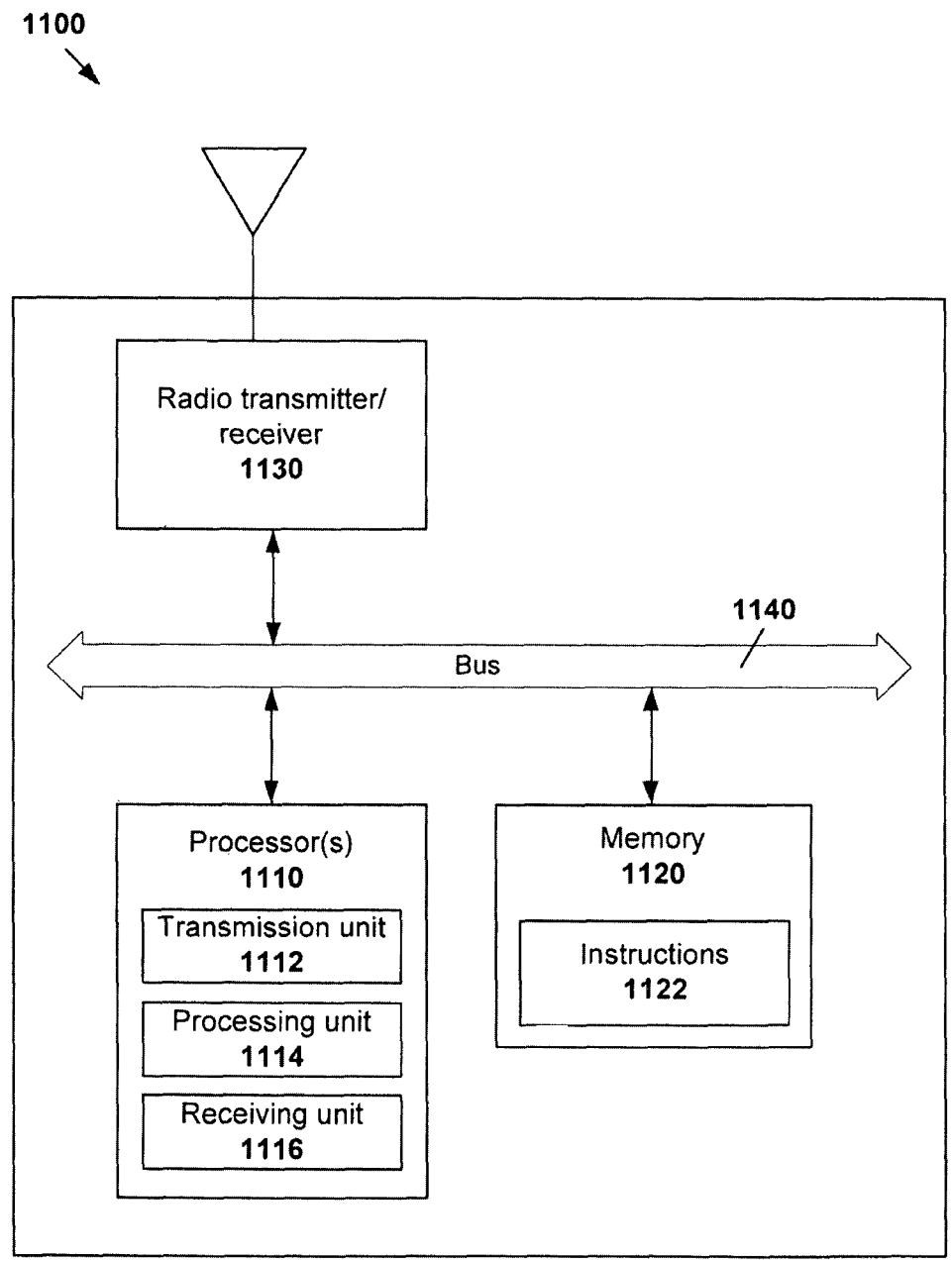
FIG. 11 is an example structure of a locator node or central processing node in FIG. 1.

The method and system in this disclosure can be implemented by hardware, software or firmware or a combination thereof. FIG. 11 shows an example structure of a device capable of acting as a locator node 110 or a location estimation node (which may be one of the locator nodes 110, a central processing node 130, or a node associated with the transmitter 120 to be tracked).

The example device 1100 includes a processor 1110, a memory 1120 and a radio transmitter and receiver (or transceiver) 1130. The processor 1110 implements functional units in the form of a transmission unit 1112, a receiving unit 1114, and a processing unit 1116. Radio signals may be transmitted and received via the radio transmitter/receiver 1130.

In the case of the locator node 110, the method of measuring time of arrival of a signal transmitted by the transmitter 120 to be tracked to the locator node 110 may be performed as follows. The receiving unit 1114 receives the signal from the transmitter 120. The processing unit 1116 performs the following:
  (a) determining an initial time of arrival value for the received signal and channel impulse response for a radio channel between the transmitter and receiver;
  (b) determining a time correction from the channel impulse response, wherein the determination is based on (i) a first value associated with a largest peak of the channel impulse response, and (i) a second value associated with a leading edge of the first value; and
  (c) from the initial time of arrival value and the time correction, determining an improved time of arrival value of the received signal.

In the case of the location estimation node, the method of estimating the location of the transmitter may be performed as follows. The receiving unit 1114 receives, from the locator nodes, the time of arrival values of signals received by the locator nodes 110 from the transmitter 120. The time of arrival values may also be received by the location estimation node wirelessly via the receiver 1130, or any wired means such as over a cable such as Universal Serial Bus (USB) or Ethernet.

The processing unit 1116 performs the following:
  (a) determining time difference of arrival values from time of arrival values measured by each pair of locator nodes based on one or more signals received from the transmitter;
  (b) based on the time difference of arrival values and an error distribution of the time difference of arrival values, determining likelihood information for multiple candidate locations of the transmitter; and
  (c) estimating the location of the transmitter from the likelihood information.

Time synchronisation of the time of arrival values may be performed by the processing unit 1116 of the locator node 110 or location estimation node (which may be a locator node 110, transmitter 120 or central processing node 130).

For example, the various methods, processes and functional units described herein may be implemented by the processor 1110. The term 'processor' is to be interpreted broadly to include a CPU, processing unit, ASIC, logic unit, or programmable gate array etc. The processes, methods and functional units may all be performed by a single processor 1110 or split between several processors (not shown in FIG. 11 for simplicity); reference in this disclosure or the claims to a 'processor' should thus be interpreted to mean 'one or more processors'.

Although a radio transmitter/receiver 1130 is shown in FIG. 11, processes performed by the radio transmitter/receiver 1130 may be split between several or separate transmitter(s) and receiver(s).

The processes, methods and functional units may be implemented as machine-readable instructions executable by one or more processors, hardware logic circuitry of the one or more processors or a combination thereof. In the example in FIG. 11, the machine-readable instructions 1122 are stored in the memory 1120.

Further, the processes, methods and functional units described in this disclosure may be implemented in the form of a computer software product. The computer software product is stored in a storage medium and comprises a plurality of instructions for making a computer device (which can be a personal computer, a server or a network device such as a router, switch, bridge, host, access point etc.) implement the methods recited in the examples of the present disclosure.

The figures are only illustrations of an example, wherein the units or procedure shown in the figures are not necessarily essential for implementing the present disclosure. Those skilled in the art will understand that the units in the device in the example can be arranged in the device in the examples as described, or can be alternatively located in one or more devices different from that in the examples. The units in the examples described can be combined into one module or further divided into a plurality of sub-units.

Although the flowcharts in FIG. 2, FIG. 3 and FIG. 7 show a specific order of execution, the order of execution may differ from that which is depicted. For example, the order of execution of two or more blocks may be changed relative to the order shown. Also, two or more blocks shown in succession may be executed concurrently or with partial concurrence. All such variations are within the scope of the present disclosure.

It will be appreciated by persons skilled in the art that numerous variations and/or modifications may be made to the above-described examples, without departing from the broad general scope of the present disclosure. The examples in the present disclosure are, therefore, to be considered in all respects as illustrative and not restrictive.

The invention claimed is:

1. A method for measuring time of arrival of a signal received by a locator node from a transmitter, the method being performed by a processor of a locator node and comprising:
  (a) determining an initial time of arrival value for the received signal and channel impulse response for a radio channel between the transmitter and receiver;
  (b) determining a time correction from the channel impulse response, wherein the determination is based on (i) a first value associated with a first peak of the channel impulse response, and (ii) a second value associated with a leading edge of the first value; and (c) correcting the initial time of arrival value of the received signal by applying the time correction to the initial time of arrival value.

2. The method of claim 1, wherein the time correction is a time delay from the second value, and determining the time correction comprises:
  determining a ratio of the second value to the first value;
  determining a location, which corresponds to the ratio, on a leading edge of a largest peak of an ideal channel impulse response with no multipath present; and
  determining the time correction as a time delay from the location to the largest peak of the ideal channel impulse response.

3. The method of claim 1, wherein:
  the first value is the first peak of the channel impulse response with a magnitude that exceeds or equals a first threshold multiplied by a largest peak of the channel impulse response; and
  the second value lies on the leading edge of the first value and corresponds to either a minimum or a second threshold multiplied by the first value.

4. The method of claim 1, wherein the signal received from the transmitter is a direct sequence spread spectrum (DSSS) signal, and the method further comprises:
  performing a frequency offset correction of the received signal to obtained a frequency-corrected signal; and
  determining the channel impulse response by correlating a reconstructed section of the transmitted signal against the frequency-corrected signal.

5. The method of claim 1, wherein the signal received from the transmitter is an orthogonal frequency division multiplexing (OFDM) signal, and the method further comprises:
  determining a channel frequency response of the received signal using, and averaged over, one or more symbols of the received signal; and
  determining the channel impulse response from the channel frequency response.

6. The method of claim 1, further comprising performing time synchronisation on the corrected initial time of arrival value using one of the following:
  global positioning system (GPS) timing receiver of the locator node;
  non-GPS synchronisation signal received by the locator node; and
  high accuracy atomic clock of the locator node.

7. The method of claim 1, wherein the locator node is a mobile device having a means to determine its location when the signal is received from the transmitter.

8. The method of claim 1, further comprising sending the corrected initial time of arrival value to a location estimation node device to estimate the location of the transmitter.

9. A non-transitory computer readable medium comprising computer-executable instructions stored thereon that when executed by a processor of a locator node device, cause the processor to perform the method for measuring time of arrival of a signal received by the locator node from a transmitter according to claim 1.

10. A locator node device for measuring time of arrival of a signal received by the locator node from a transmitter, the device comprises:
  a receiver to receive, from the transmitter, the signal; and
  a processor to:
    (a) determine an initial time of arrival value for the received signal and channel impulse response for a radio channel between the transmitter and receiver;
    (b) determine a time correction from the channel impulse response, wherein the determination is based on (i) a first value associated with a first peak of the channel impulse response, and (ii) a second value associated with a leading edge of the first value; and
    (c) correcting the initial time of arrival value of the received signal by applying the time correction to the initial time of arrival value.

* * * * *